July 8, 1952

J. H. ORR 2,602,202

WEATHER SEALING STRIP

Filed Nov. 23, 1949

INVENTOR.
JOHN H. ORR
BY
Mawhinney & Mawhinney
Attys.

Patented July 8, 1952

2,602,202

UNITED STATES PATENT OFFICE 2,602,202

WEATHER SEALING STRIP

John Hewitt Orr, Coventry, England, assignor to Carbodies Limited, Coventry, England Application November 23, 1949, Serial No. 128,999
In Great Britain April 9, 1949

4 Claims. (Cl. 20—69)

1

The invention relates to a weather sealing strip, for example, for sealing a gap round a door of an automobile.

The main object of the invention is to provide such a strip which is not only simple and inexpensive to produce, but which can be used effectively in a variety of positions and be secured in position in alternative ways.

A further object is to provide a weather sealing strip which includes a resiliently-deformable strip of an appropriate cross-section for effecting the seal, and a ductile strip having one longitudinal marginal portion engaged with the resiliently-deformable strip in parallel relationship, and having the other longitudinal marginal portion provided with spaced, parallel fingers which are integral therewith, the fingers serving for locating the ductile strip with respect to one of the members between which a gap is to be sealed.

Preferably the resiliently-deformable strip and the ductile strip are provided with inter-engaging flanges for effecting their engagement, these flanges being hook-like in cross-section. The said flanges of the ductile strip can be formed as a plurality of spaced, parallel fingers, and, in that case, those fingers can be staggered with respect to the fingers on the other margin whereby to facilitate the bending of the ductile strip in its own plane (e. g., for facilitating curving the weather sealing strip to conform to a curved gap between a door and its surround).

For a better understanding of these and other objects and advantages of the invention, attention should be directed to the following description in which reference is made to the accompanying drawings, wherein.

Figure 1:
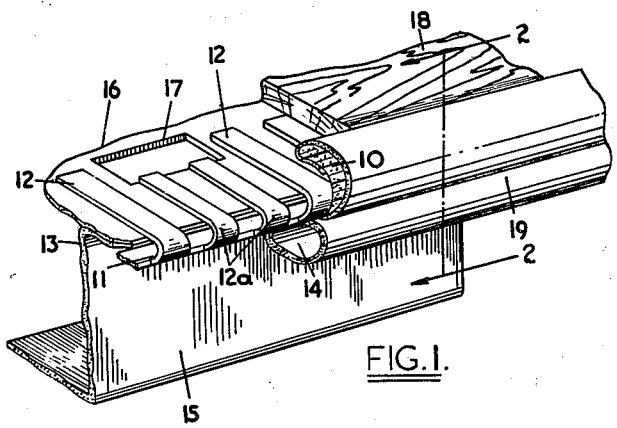
Figure 1 is a perspective view of one form of weather sealing strip, according to the invention, shown applied to a door pillar, shown on its side for convenience of illustration, of an automobile.
Figure 2:
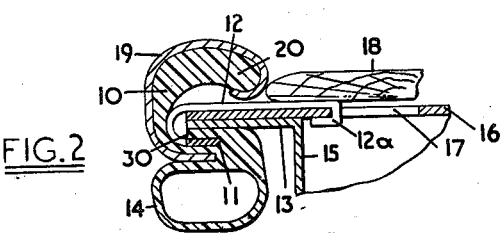
Figure 2 is a section on the line 2—2 of Figure 1 and drawn to a larger scale.

Referring to Figures 1 and 2, the resiliently-deformable strip 10 is somewhat of S-section, and, centrally thereof, it has a slit in which a continuous edge 11 of the ductile strip is hooked. Integral with the edge 11 is a plurality of fingers

2

12 for effecting an engagement with a part to which the weather sealing strip is to be assembled.

In the example shown, the weather sealing strip is to be applied to a flange 13 of a doorway, the door when closed abutting the hollow bead portion 14 of the seal with the edge of the door lying parallel with the surface 15 of the doorway. Integral with or rigidly secured to the flange 13 is a plate 16 (constituting, in the present instance, a part of the inner wall of the automobile body), and this plate can be provided with an aligned series of openings 17 over the adjacent edges of which the fingers can be bent as shown in Figure 2. Two of such bent fingers are indicated at 12a. It will be seen that the lip 30, of the resiliently-deformable strip, is firmly gripped between the edge 11 of the ductile strip and the flange 13. If part of the doorway is concavely curved the edge 11 of the ductile strip can be bent in its own plane to enable the seal to be applied thereto.

To obscure the fingers an ornamental or other strip 18 can be applied, in any suitable manner, to the plate 16, and, when thus assembled, the weather sealing strip is prevented from becoming disengaged not only in the plane of the sheet 16 by the fingers, but also in a plane at right-angles to the plate 16 by the strip 18.

The resiliently-deformable strip can have an additional slot within which is resiliently gripped one edge of a decorative covering material 19 (e. g., a fabric which matches the upholstery of the interior of the motor car), the opposite edge of the covering material being trapped resiliently beneath a lip 20 of the resiliently-deformable strip. Obviously, however, the covering material could be additionally secured in position, as by an adhesive, and the strip 18 can be extended slightly laterally, as shown, so as to just lie beneath the lip 20.

Figure 3:
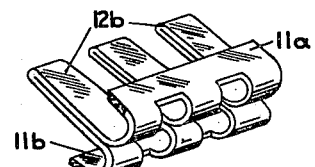
Figures 3, 4 and 5 are perspective views of three modified forms of the ductile strip.

Although the fingers have been shown bent downwardly to engage over an edge of an opening 17, they could obviously be bent upwardly to engage over an edge of a hole in a plate above, or they could be inserted between two spaced plates defining an angle and secured thereto in any desirable manner (e. g., by bending round the angle). If, however, the strip is to be applied to a plain surface the fingers could be secured thereto as by spot welding (if the surface is of metal) or by nails, passed through or between the fingers, if the surface is of wood.

Where it is desired to hold two resiliently-deformable strips side by side, or to effect a double connection with twin slits of a single resiliently-deformable strip, the ductile strip can be of the double form shown by Figure 3. That strip can be formed by stamping a single sheet of ductile material and bending it to the form shown, the edges 11a and 11b serving for engaging the slits in the resiliently-deformable strips or strip and the doubled fingers 12b serving for attachment purposes.

Figure 4:
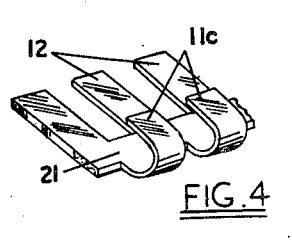

Figure 4 shows a modified form of the ductile strip of Figures 1 and 2 of which the edge for engaging in the slit of the resiliently-deformable strip is in the form of fingers 11c, the fingers 11c and the fingers 12 being united, in staggered relationship, by a continuous portion 21. The ductile strip thus formed permits the weather sealing strip as a whole to be bent more easily in the plane of the portion 21 so as to conform to a concavely curved doorway.

Figure 5:
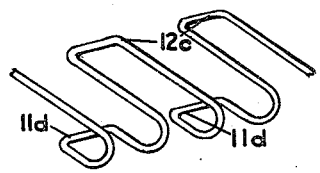

Figure 5 shows a variant of the construction of Figure 4, the ductile strip being formed of wire and bent to the form shown so as to provide attachment fingers 12c and fingers 11d for engaging with the resiliently-deformable strip.

Figure 6:
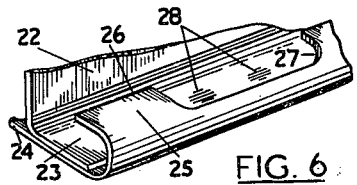
Figure 6 is a perspective view of a fragment of a sheet metal structure showing how the latter can be made to facilitate spot welding of the parts together and, at the same time, be adapted for receiving a weather sealing strip according to the invention.

Figure 6 shows a portion of a plate 22 having a flange 23 to be secured to a plate 24 which has a rolled edge 25 to which the weather sealing strip of the invention is to be applied by engaging the fingers 12 over the edge 26. In this case the latter can be gapped as shown at 27 to enable the plates 22 and 24 to be spot-welded, as at 28.

It will readily be seen that the series of fingers 12 enable the weather sealing strip of the invention to be applied in a variety of ways to members requiring to be sealed, and that the fingers enable advantage to be taken of flanges, holes, etc., of the said members for the purpose.

Although in the examples described above the weather sealing strip is for connection to a doorway it could obviously be applied to an edge of a door or used in other ways. Also it should be understood that the form of the resiliently-deformable strip, except in so far as its connection to the ductile strip is concerned, forms no part of the present invention.

What I claim as my invention and desire to secure by Letters Patent of the United States is:

1. A weather sealing strip, for sealing a gap between a movable member and a coacting stationary member, comprising a strip of resilient material, and a ductile strip of generally J-shape in end elevation, one flange only of the ductile strip, which need not be a continuous flange, being completely embedded in the resilient strip and the other flange having a portion extending outwardly of said resilient strip and being formed as a plurality of parallel integrally-joined fingers of greater length than the corresponding dimension of the embedded flange, said fingers serving for the attachment of the sealing strip to one of the said members, and the sealing strip providing a continuous strip portion, to be compressed between the said members when the movable member is in the closed position.

2. A weather sealing strip, for sealing a gap between a movable member and a stationary coacting member, comprising a strip of resilient material, and a ductile strip of generally J-shape in end elevation and having a shorter flange and a longer flange, the shorter flange of the ductile strip, which need not be a continuous flange, being entirely embedded in the resilient strip and the longer flange having a portion extending outwardly from said resilient strip and the extended portion being formed as a plurality of parallel integrally joined fingers which serve for the attachment of the sealing strip to one of said members, the resilient strip being shaped to also extend round the bent intermediate portion of the ductile strip and to cover parts of the longer flange, and providing, on the other other side of the embedded flange, a continuous hollow strip portion to be pressed between the said members when the movable member is in the closed position.

3. A weather sealing strip for sealing a gap between a movable member and a coacting stationary structure having a plate provided with a series of openings, comprising a strip of resilient material, and a ductile strip of substantially J-shape in end elevation, one flange of the ductile strip being embedded in the resilient strip and the other flange comprising a plurality of fingers joined at their inner ends to said one flange, the outer free end portions of the fingers being hook shaped and being received by the openings in said plate so that the adjacent edges of the plate openings are received by the hooks on said fingers to anchor the ductile strip and the resilient strip firmly in place.

4. A weather sealing strip for sealing a gap between a movable member and a coacting stationary doorway having a flange, comprising a resilient strip having a longitudinally extending recess therein and a longitudinally extending slit parallel to and spaced from said recess to provide a lip between said recess and said slit, a portion of the doorway flange being received by said recess and engaging the wall of the recess adjacent said lip, a ductile strip having one flange attached to the doorway and having a portion received by said recess and overlying the doorway flange and having a second flange received by said slit so that said lip is pinched against the underside of the doorway flange, and a strip secured to the doorway and in engagement with the said one flange of the ductile strip to restrain the ductile strip against movement at substantially right angles to the plane of the doorway.

JOHN HEWITT ORR.

REFERENCES CITED

The following references are of record in the file of this patent:

UNITED STATES PATENTS

| Number | Name | Date |
|---|---|---|
| 2,169,503 | Schlegel | Aug. 15, 1939 |
| 2,554,452 | Bright | May 22, 1951 |